United States Patent
Wirola et al.

(10) Patent No.: US 10,670,690 B2
(45) Date of Patent: Jun. 2, 2020

(54) METHOD AND APPARATUS FOR EFFICIENTLY REDUCING NUMBER OF ACCESS POINTS IN A RADIO MAP USING GRIDS

(71) Applicant: HERE Global B.V., Eindhoven (NL)

(72) Inventors: Lauri Wirola, Tampere (FI); Laura Wirola, Tampere (FI); Jari Syrjarinne, Tampere (FI); Mikko Blomqvist, Lempäälä (FI); Tommi Laine, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/265,498

(22) Filed: Feb. 1, 2019

(65) Prior Publication Data

US 2019/0162814 A1    May 30, 2019

Related U.S. Application Data

(63) Continuation of application No. 14/904,914, filed as application No. PCT/EP2014/062204 on Jun. 12, 2014, now Pat. No. 10,241,189.

(30) Foreign Application Priority Data

Jul. 18, 2013    (FI) ..................................... 20135778

(51) Int. Cl.
*G01S 5/02*    (2010.01)

(52) U.S. Cl.
CPC .......... *G01S 5/0252* (2013.01); *G01S 5/0236* (2013.01)

(58) Field of Classification Search
CPC .... G01S 5/0252; G01S 5/0236; G01S 5/0242; H04W 64/00; H04W 16/20; H04W 4/02; H04W 64/003
See application file for complete search history.

(56) References Cited

U.S. PATENT DOCUMENTS

| | | | |
|---|---|---|---|
| 6,865,483 B1 * | 3/2005 | Cook, III | G01C 21/3682 340/995.14 |
| 8,165,808 B2 * | 4/2012 | Scheibe | G01C 21/367 340/995.1 |

(Continued)

FOREIGN PATENT DOCUMENTS

| | | | | |
|---|---|---|---|---|
| CN | 101686546 A | | 3/2010 | |
| GB | 2516284 A | * | 1/2015 | ............ H04W 16/20 |
| KR | 2008016031 A | | 2/2008 | |

OTHER PUBLICATIONS

Chinese Office Action for Chinese Patent Application No. 2018011201566980, dated Jan. 17, 2018, with English Translation.

(Continued)

*Primary Examiner* — Matthew C Sams
(74) *Attorney, Agent, or Firm* — Lempia Summerfield Katz LLC

(57) ABSTRACT

In accordance with an example embodiment, an apparatus comprises at least one receiver configured to receive a grid corresponding to an area, at least one processor configured to assign at least one access point in the area to at least one node in the grid, and the at least one processor configured to select a predetermined number of access points assigned to the at least one node for inclusion in a partial radio map.

20 Claims, 6 Drawing Sheets

(56) References Cited

U.S. PATENT DOCUMENTS

| | | | |
|---|---|---|---|
| 8,175,618 B2* | 5/2012 | Casey | G01C 21/00 |
| | | | 348/231.3 |
| 8,830,271 B1* | 9/2014 | Jordan | G01C 21/3682 |
| | | | 345/611 |
| 8,938,255 B2 | 1/2015 | Tsruya et al. | |
| 10,039,053 B2* | 7/2018 | Wirola | H04L 43/16 |
| 2004/0243307 A1* | 12/2004 | Geelen | G01C 21/3635 |
| | | | 701/469 |
| 2007/0133487 A1 | 6/2007 | Wang et al. | |
| 2009/0055087 A1* | 2/2009 | Beacher | G01C 21/36 |
| | | | 701/532 |
| 2010/0246405 A1* | 9/2010 | Potkonjak | G01S 5/0226 |
| | | | 370/241 |
| 2011/0176494 A1* | 7/2011 | Huang | G01S 5/02 |
| | | | 370/329 |
| 2012/0046861 A1* | 2/2012 | Feldbauer | G09B 29/106 |
| | | | 701/426 |
| 2012/0149415 A1* | 6/2012 | Valaee | H04W 64/00 |
| | | | 455/507 |
| 2013/0035109 A1* | 2/2013 | Tsruya | G01S 5/0252 |
| | | | 455/456.1 |
| 2015/0223027 A1* | 8/2015 | Ahn | G01S 5/0236 |
| | | | 455/456.1 |
| 2016/0161591 A1* | 6/2016 | Wirola | G01S 5/0252 |
| | | | 455/456.1 |

OTHER PUBLICATIONS

Chinese Office Action for related Chinese Application No. 201480040768 dated Jul. 3, 2017, with English Translation.
Chinese Office Action for related Chinese Application No. 201480040768 dated Nov. 10, 2016, with English Translation.
European Office Action for European Patent Application No. 14733567. 3-1812, dated Mar. 31, 2017.
Figuera et al., Time-Space Sampling and Mobile Device Calibration of WiFi Indoor Location Systems, Jul. 2011, vol. 10, No. 7, IEEE Transactions on Mobile Computing.
Finnish Search Report cited in Finnish Patent No. 20135778, dated Mar. 16, 2014.
International Preliminary Report on Patentability cited in PCT/EP2014/062204, dated Jan. 19, 2016.
International Search Report cited in PCT/EP2014/062204, dated Sep. 10, 2014.
Xu et al., Dynamic Indoor Localization Techniques based on RSSI in WLAN Environment, Oct. 26-18, 2011, Section 3.2, Proceedings of 6th International Conference on Pervasive Computing and Application, Port Elizabeth, South Africa.
Xu et al., Optimization of WLAN Indoor Location Network Based on Signal Coverage Requirement, Sep. 17, 2010, Pervasive Computing Signal Processing and Applications.

\* cited by examiner

FIGURE 5
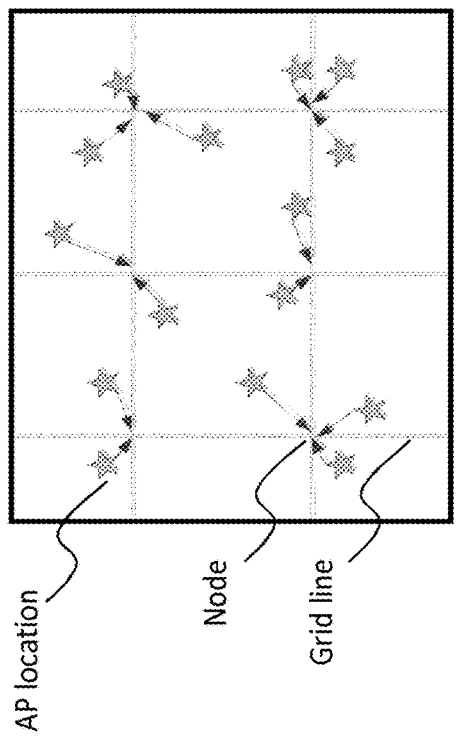
(a) Area will all APs.
AP location
Node
Grid line
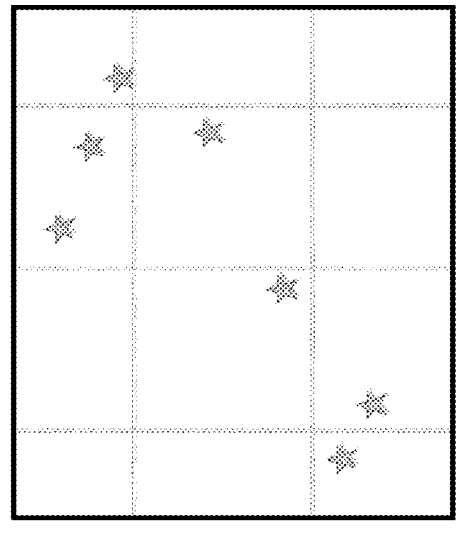
(c) Random selection of APs
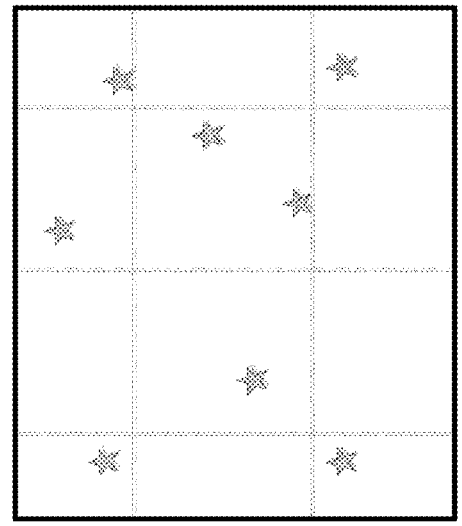
(b) Grid based selection of APs

METHOD AND APPARATUS FOR EFFICIENTLY REDUCING NUMBER OF ACCESS POINTS IN A RADIO MAP USING GRIDS

This application is a continuation under 35 U.S.C. § 120 and 37 C.F.R. § 1.53(b) of U.S. application Ser. No. 14/904,914 filed on Jan. 13, 2016 and entitled "Method and Apparatus for Efficiently Reducing Number of Access Points in a Radio Map Using Grids," which claims benefit under 35 U.S.C. § 371 of International Patent Application PCT/EP2014/062204, which was filed on Jun. 12, 2014, which claims the benefit of FI 20135778, filed on Jul. 18, 2013, the contents of each of which are incorporated herein by reference.

TECHNICAL FIELD

The present application relates generally to reducing number of access points in a radio map using grids.

BACKGROUND

Modern global cellular and non-cellular positioning technologies are based on generating large global databases containing information on cellular and non-cellular signals. The information may originate entirely or partially from users of these positioning technologies. This approach may also be referred to as "crowd-sourcing".

The information provided by users may be in the form of "fingerprints", which contain a location that is estimated based on, for example, received satellite signals of a global navigation satellite system, GNSS, and measurements taken from one or more radio interfaces for signals of a cellular and/or non-cellular terrestrial system. In the case of measurements on cellular signals, the results of the measurements may contain a global and/or local identification of the cellular network cells observed, their signal strengths and/or path losses and/or timing measurements like timing advance, TA, or round-trip time. For measurements on wireless local area network, WLAN, signals, as an example of signals of a non-cellular system, the results of the measurements may contain at least one of a basic service set identification, BSSID, like the medium access control, MAC, address of observed access points, APs, the service set identifier, SSID, of the access points, and the signal strengths of received signals. A received signal strength indication, RSSI, or physical reception level may be expressed in dBm units with a reference value of 1 mW, for example.

Such data may then be transferred to a server or cloud, where the data may be collected and where further models may be generated based on the data for positioning purposes. Such further models can be coverage area estimates, communication node positions and/or radio channel models, with base stations of cellular communication networks and access points of WLANs being exemplary communication nodes. In the end, these refined models, also known as radio maps, RM, may be used for estimating the position of mobile terminals.

Fingerprints do not necessarily have to comprise a GNSS based position. They may also include cellular and/or WLAN measurements only. In this case the fingerprint could be assigned a position for example based on a WLAN based positioning in a server. Such self-positioned fingerprints can be used to learn cellular network information, in case there are cellular measurements in the fingerprint. Moreover, in a set of WLAN measurements in a fingerprint there may be, in addition to measurements for known WLAN access points, also measurements for unknown access points and the position of the unknown access points can be learned through these self-positioned fingerprints. Finally, more data can be learned of previously known access points based on self-positioned fingerprints.

It may be noted that even when using a mobile terminal having GNSS-capabilities, a user may benefit from using cellular/non-cellular positioning technologies in terms of time-to-first-fix and power consumption. Also, not all applications require a GNSS-based position. Furthermore, cellular/non-cellular positioning technologies work indoors as well, which is generally a challenging environment for GNSS-based technologies.

SUMMARY

Various aspects of examples of the invention are set out in the claims.

According to a first aspect of the present invention, an apparatus comprises at least one processor configured to divide an area into a grid, the at least one processor configured to assign access points in the area to at least one node in the grid, the at least one processor configured to select, from the at least one node, a predetermined number of access points for inclusion in a partial radio map, and a memory configured to store identities of the selected access points.

According to a second aspect of the present invention, a method comprises dividing an area into a grid, assigning access points in the area to at least one node in the grid, and selecting, from at least one node, a predetermined number of access points for inclusion in a partial radio map.

According to further aspects of the present invention, computer programs are provided that are configured to cause methods in accordance with the second aspect to be performed.

BRIEF DESCRIPTION OF THE DRAWINGS

For a more complete understanding of example embodiments of the present invention, reference is now made to the following descriptions taken in connection with the accompanying drawings in which:

FIG. 5 shows spatial coverage of APs before and after application of a method according to an example embodiment of the invention.

DETAILED DESCRIPTION OF THE DRAWINGS

Positioning systems may function in two modes. A first mode is a terminal-assisted mode, in which a terminal performs measurements of cellular and/or non-cellular air interface signals and provides results of the measurements to a positioning server hosting a global cellular and/or non-cellular RM database. The server then provides a position estimate back to the terminal. This methodology is called online positioning and requires the terminal to have data connectivity whenever positioning service is needed.

A second mode is a terminal-based mode, an offline positioning technique, in which a terminal has a local copy of a RM, called a partial RM. This partial RM is a subset of the global RM in form of WLAN RM offline files, for example. These files may be in the form of a database or any other form that is readable by a computer. There may be multiple such files, since it may be advantageous not to have a single global file, but several smaller ones so that the terminal may only download partial RM for a specific area, for example, a country or a city where a need for positioning is anticipated. This subset can also be pre-installed on the terminal. In at least one of the downloaded and pre-installed case, data in the subset may need to be refreshed at some point. Offline positioning techniques do not require the terminal to have data connectivity whenever positioning service is needed.

Offline positioning may be advantageous from a service perspective because it helps reduce load on positioning servers. Also, since terminals are capable of positioning themselves without contacting a positioning server, the terminals may remain location aware all the time. Additionally, time-to-first-fix may be very short, since the device does not need to contact the server.

WLAN RM offline files can be very large in size. As an example, in an urban/suburban area covering roughly 10×10 km, there can be more than 10 million APs. This results in an average density of one AP every 10 $m^2$ or 400,000 APs per 2×2 km tile. Transferring location information for each of these APs from a server to a terminal consumes a lot of server resources, network bandwidth, storage space in the terminal and it can also be quite expensive to the consumer in the form of data charges. Thus, it is desirable to reduce the number of APs in a partial RM and resultantly have smaller size WLAN RM offline files while still maintaining similar spatial coverage and similar relative spatial density of APs.

Embodiments of the present invention relate to reducing a number of APs in a partial RM. This may be achieved by dividing an area into a grid, mapping each AP to a node in the grid and then selecting a subset of APs from each node of the grid. For example, if a number of APs in an area for inclusion in a partial RM is to be reduced by 75%, 25% of APs from each node may be chosen for inclusion in a partial RM.

Figure 1:
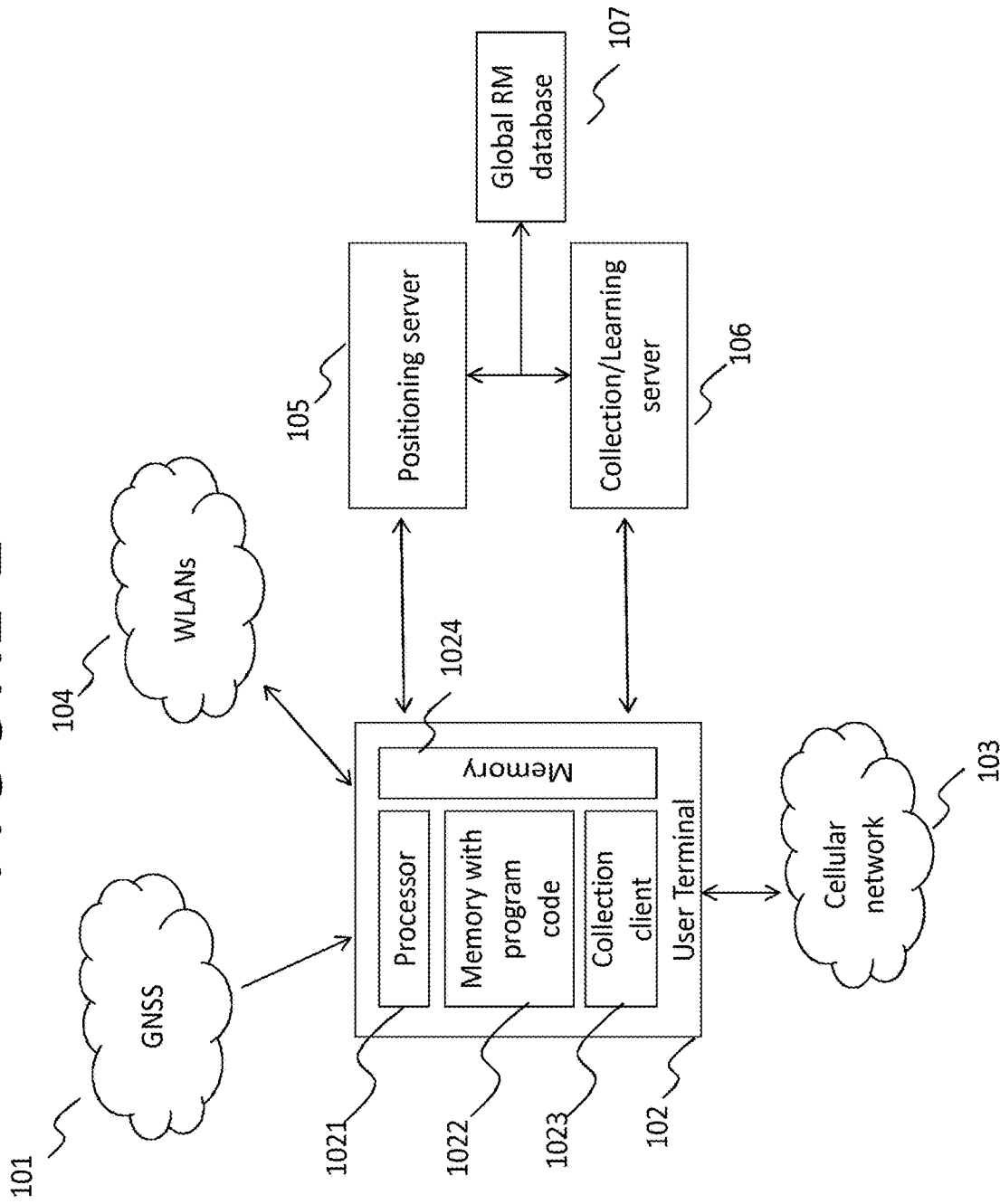
FIG. 1 shows an example architecture of a positioning system.

FIG. 1 shows an example architecture of a positioning system. The positioning system of FIG. 1 comprises a GNSS 101, a user terminal 102, a cellular network 103, WLAN systems 104, a positioning server 105, a collection/learning server 106 and a global RM database 107. Positioning server 105 and collection/learning server 106 may be co-located in a single site or apparatus, or alternatively they may be distinct in the sense that positioning server 105 is external to collection/learning server 106 and collection/learning server 106 is external to positioning server 105. Global RM database may be a standalone node, or it may be comprised in collection/learning server 106 and/or positioning server 105. The user terminal 102 may receive its GNSS based position from the GNSS 101. The GNSS could be GPS, GLONASS or any other satellite based navigation system. The user terminal may also receive radio signals from the cellular network 103. The cellular communication network 103 could be based on any kind of cellular system, for instance a GSM system, a 3rd Generation Partnership Project (3GPP) based cellular system like a WCDMA system or a time division synchronous CDMA (TD-SCDMA) system, e.g. supporting high speed packet access (HSPA), a 3GPP2 system like a CDMA2000 system, a long term evolution (LTE) or LTE-Advanced system, or any other type of cellular system, like a WiMAX system. Cellular communication network 103 comprises a plurality of base stations or base transceiver stations as communication nodes. Furthermore, user terminal 102 may also receive signals from WLANs 104. WLANs 104 comprise at least one access point as a communication node. WLANs 104 may be based upon the IEEE 802.11 standards, for example.

The user terminal 102 comprises a processor 1021, and linked to the processor, a memory 1022. Memory 1022 stores computer program code in order to cause the user terminal 102 to perform desired actions. Processor 1021 is configured to execute computer program code stored in memory 1022. The user terminal further comprises memory 1024 to store additional data such as, for example, partial RMs. The user terminal may further include at least one antenna in communication with at least one transmitter and at least one receiver to enable communication with the GNSS 101, cellular network 103, WLAN 104, positioning server 105 and collection/learning server 106. The mobile terminal processor 1021 may be configured to provide signals to and receive signals from the at least transmitter and the at least one receiver, respectively.

Although not shown, the user terminal 102 may also include one or more other means for sharing and/or obtaining data. For example, the apparatus may comprise a short-range radio frequency, RF, transceiver and/or interrogator so data may be shared with and/or obtained from electronic devices in accordance with RF techniques. The user terminal may comprise other short-range transceivers, such as, for example, an infrared, IR, transceiver, a Bluetooth™, BT, transceiver operating using Bluetooth™ brand wireless technology developed by the Bluetooth™ Special Interest Group, a wireless universal serial bus, USB, transceiver and/or the like. The Bluetooth™ transceiver may be capable of operating according to low power or ultra-low power Bluetooth™ technology, for example, Bluetooth low energy, radio standards. In this regard, the user terminal 102 and, in particular, the short-range transceiver may be capable of transmitting data to and/or receiving data from electronic devices within a proximity of the apparatus, such as within 10 meters, for example. The apparatus may be capable of transmitting and/or receiving data from electronic devices according to various wireless networking techniques, including 6LoWpan, Wi-Fi, Wi-Fi low power, IEEE 802.15 techniques, IEEE 802.16 techniques, and/or the like.

The user terminal further comprises a collection client 1023. The collection client 1023 may comprise, for example, a software module stored in memory 1022, or in another memory comprised in user terminal 102. The collection client 1023 may be configured to collect information comprising at least one of the following to be sent to the collection/learning server 106:

An estimate of the user terminal's location based on, for example, received satellite signals of the GNSS 101

Measurements taken from signals of the cellular network 103.

Results of scanning of WLAN systems 104.

Results of scanning of other short range radio signals.

The collection/learning server 106 receives this information and based on it, builds a database of AP locations and coverage areas of cellular base stations and APs, such as for example WLAN APs. Such a database may be called a global RM database 107 since the RMs stored in this database may not be specific to a country or a city. Rather, they may be global in nature. In some embodiments, collection/learning server 106 is configured to build a database of AP locations that does not comprise information on coverage areas of cellular base stations.

Once a reliable global RM database 107 is built, the positioning server 105 may serve online positioning requests from user terminals. A user terminal may take measurements of signals from cellular networks and/or perform WLAN scans and send them to the positioning server 105. The positioning server may refer to the global RM database and based at least in part upon the information provided by the user terminal, provide an estimate of the user terminal position.

If a data connection between the positioning server and a user terminal is unavailable or is undesirable, the terminal may rely on offline positioning. For terminal based offline positioning to work, a partial RM or a subset of the global RM in form of RM offline files, such as for example WLAN RN offline files, may be stored in the memory 1024 of the user terminal. With a partial RM pertaining to the area in which a user terminal is presently located stored in a memory of the user terminal, the user terminal may scan the WLANs and/or signals from cellular networks at its location and after consulting a partial RM stored in its memory, find its position without sending a request to a positioning server. It should be noted that partial RMs may be based upon access points of short range wireless systems other than WLAN systems and a user terminal may scan for signals from at least one of these other short range wireless systems to estimate its position.

Figure 2:
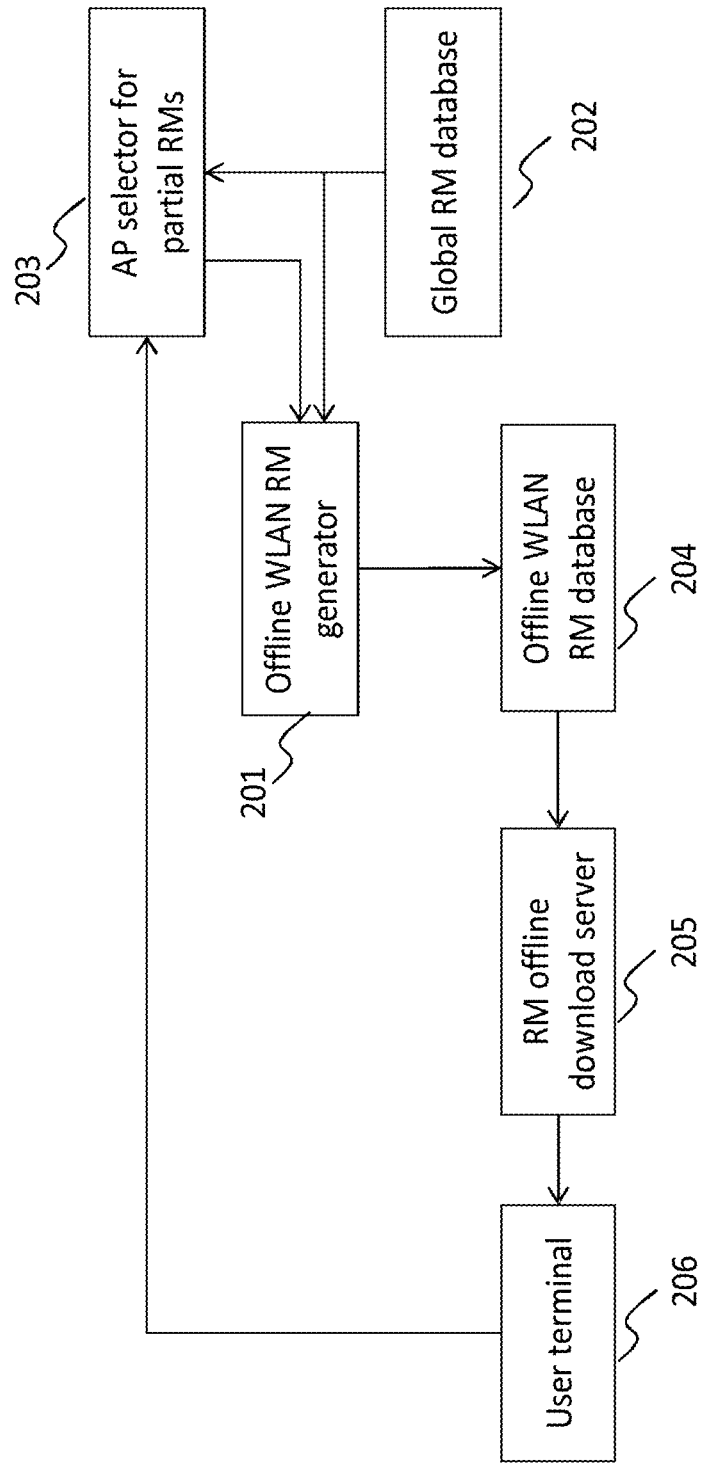
FIG. 2 shows an example system for generating and distributing partial RMs for offline usage in user terminals.

FIG. 2 shows an example system for generating and distributing partial RMs for offline usage in user terminals. In accordance with an embodiment of the present invention, the offline WLAN RM generator, OW-RMG, 201 takes as inputs a global RM from the global database 202 and a list of WLAN APs to be included in a partial RM from the AP selector for partial RMs 203. As discussed earlier, it is not desirable to include all APs in offline RMs to be stored on a user terminal and the AP selector for partial RMs 203 helps achieve this goal by identifying a reduced set of APs which will result in partial RMs with desirable spatial coverage and relative spatial density of APs. The selection of APs by the AP selector for partial RMs 203 may be based at least in part on the location of the APs. The OW-RMG 201 may further refine the list of APs received from the selector 203 based upon a set of at least one criterion. The OW-RMG 201 generates partial RMs based upon these inputs and transfers them for storage to the offline WLAN RM database 204. The partial RMs needed by a user terminal 206 are then transferred by the offline WLAN RM database 204 to the RM offline download server 205. In another embodiment of the invention, the offline WLAN RM database 204 may be absent and a partial RM file may be transmitted directly from the OW-RMG 201 to the RM offline download server 205. From the download server, they may be downloaded by the user terminal 206 or any other user terminal. The user terminal may include at least one antenna in communication with at least one transmitter and at least one receiver to enable communication with the download server. Similarly, the download server may include at least one antenna in communication with at least one transmitter and at least one receiver to enable communication with the user terminal. The download server may further include a processor configured to provide signals to and receive signals from the transmitter and receiver, respectively.

It is highly desirable to have partial RMs which, although based upon a smaller number of APs, result in substantially similar spatial coverage and relative AP density as non-reduced set of APs. In accordance with embodiments of the present invention, this can be achieved if an area is divided into a grid, access points in the area are mapped to nodes of this grid and at least one criterion is applied for selecting a set of APs from each node of the grid. For example, if it is desirable to reduce the number of APs in an area by 60% and build a partial RM with only 40% of the APs, 40% of the APs may be chosen from each node. In addition, a condition may be imposed such that each node which has an AP assigned to it, must have at least one AP still assigned to it after reduction. For example, if two APs are assigned to a node, then even though 60% of APs are to be reduced, the node may still have one AP assigned to it after reduction.

Global RM database 202, AP selector for partial RMs 203, Offline WLAN RM generator 201, Offline WLAN RM database 204 and RM offline download server 205 may be implemented as standalone nodes in a network, or alternatively at least two and optionally even all of them may be implemented as functions in a single physical server.

Figure 3:
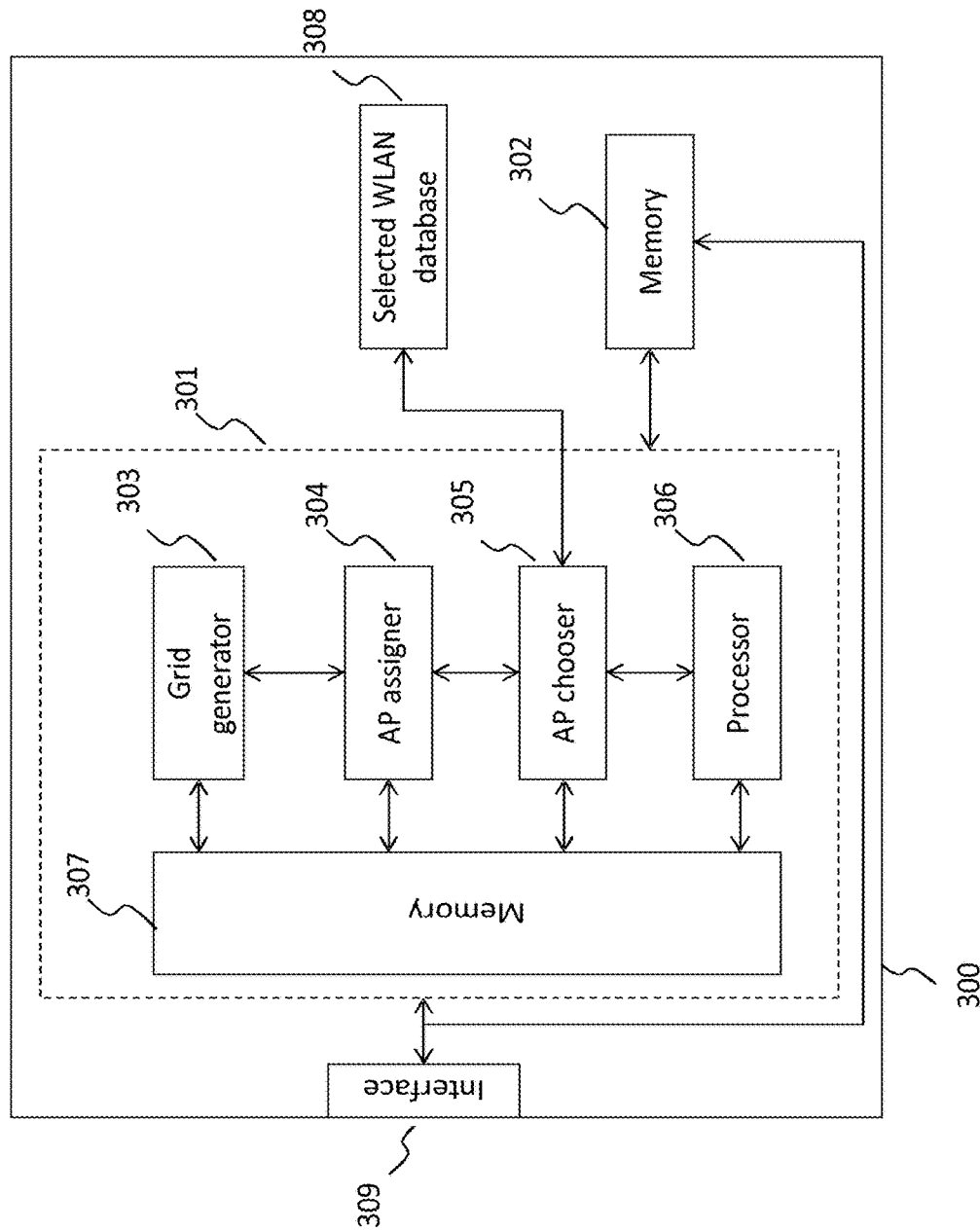
FIG. 3 shows an apparatus embodying a process for grid based selection of APs according to an example embodiment of the invention.

FIG. 3 shows an example apparatus embodying a process for reducing number of access points in a partial RM using a grid according to an example embodiment of the invention. As an example, FIG. 3 may represent the AP selector for partial RMs 203 of FIG. 2. Apparatus 300 comprises processors 301, 303, 304, 305, 306 and, linked to these processors, a memory 307. The processors 301, 303, 304, 305, 306 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. A processor comprising exactly one processing core may be referred to as a single-core processor, while a processor comprising more than one processing core may be referred to as a multi-core processor. Accordingly, although illustrated in FIG. 3 as single processors, in some embodiments the processors 303, 304, 305, 306 may comprise a plurality of processors or processing cores. Similarly, processors 303, 304, 305, 306 may be embodied within one processor 301. In some embodiments, at least one of processors 303, 304, 305 and 306 are implemented at least in part in software, which software may be run on processor 301. Memory 307 stores computer program code for supporting reducing a number of access points in a partial radio map using grids. Processors 301, 303, 304, 305, 306 are configured to execute computer program code stored in memory 307 in order to cause the apparatus to perform desired actions. Apparatus 300 further comprises memory 302. Memory 302 may be used, at least in part, to store input data needed for operations of the apparatus 300 or output data resulting from operation of the apparatus 300. Apparatus 300 could be a server or any other suitable device. Apparatus 300 could equally be a module, like a chip, circuitry on a chip or a plug-in board, for a server or for any other device. Optionally, apparatus 300 could comprise various other components, such as for example at least one of a user interface, a further memory and a further processor.

Memory 302 and memory 307 may be distinct memories, or alternatively memory 302 may be comprised in memory 307, or memory 307 may be comprised in memory 302.

Interface 309, which may be a data interface, may receive an identification of an area for which a partial radio map with reduced number of APs is to be generated. The interface 309 may also receive a list of APs located in this area. This area may also be called an area of interest. The list of APs may be received from the global RM database 202, for example. The list of APs may comprise a list of AP identities and/or AP locations. An AP identity may comprise a service set identification, SSID and/or a basic service set identifier, BSSID. In some embodiments, the list comprises identities of base stations, such as for example cellular base stations.

The grid generator 303 generates a grid to be used for the area of interest. Parameters needed for generation of the grid may be received by the interface 309 and transferred to the grid generator 303. In an example embodiment of the invention, a density of the grid in various sections of the area of interest may vary according to the density of APs located in the various sections. For example, in urban sections of the area where the AP density is high, the nodes of the grid may close to each other, resulting in a dense grid or small distance between grid nodes. For example, the grid may comprise squares of 50 meters×50 meters. A dense grid ensures that while selecting a subset of APs in a section to be included in a partial RM, a representative sample of APs may be selected. In rural areas the AP density is lower and larger distance between nodes could be used, resulting in larger distances between grid nodes and a lower grid density. For example, the grid in a rural area may comprise squares of 100 meters×100 meters. Grid density may be same throughout the area of interest resulting in a uniform grid or it may vary, resulting in a non-uniform grid. A grid may be constant in metric domain or it may be constant in degree domain. A grid that is constant in metric domain may comprise squares of side length equal to 50 meters, for example. A grid that is constant in degree domain may be constructed such that it comprises of squares spanning a predetermined number of degrees, or fractions of degrees, of latitude and longitude. For example, a grid may be constructed such that it comprises squares of 0.001×0.001 degrees. This is approximately 110 meters×110 meters on the equator but 55 meters×110 meters on the 60 degree latitude. Further, a grid may be constructed such that it may have different grid sizes in North-South and East-West directions. In general, the grid generator 303 may generate a grid covering the area of interest with the distance between the nodes of the grid being constant or variable in any dimension or metric.

In another embodiment of the invention, the grid generator may be absent and the apparatus 300 may receive parameters for generating a grid from a processor external to the apparatus 300 via the interface 309, for example. These grid parameters may include grid density and/or node locations, for example. In general, grid parameters may be one or more parameters with the help of which, a grid may be generated. Receiving grid parameters may also be referred to as receiving the grid. In other words, receiving parameters using which a grid may be generated may be referred to as receiving the grid. The AP assigner 304 assigns APs in the area of interest to nodes of a grid generated by the grid generator 303. The list of APs in the area of interest and/or the locations of these APs may be received from the global RM database 202 via the interface 309, and the grid may be received from the grid generator 303. One or more of the grid, the list of APs, and the AP locations may also be retrieved from the memory 302 or memory 307, for example.

In an example embodiment of the invention, the AP assigner may assign an AP to a node that is closest to the location of the AP. In another example embodiment of the invention, mapping of APs to grid nodes may be performed using a 0.001 degree grid (110 meters×110 meters at the Equator). The origin of the grid (originLat, originLon) may be set to lower left corner of the area of interest. An AP with coordinates (Lat, Lon) can then be mapped to a node in the grid with coordinates in the grid (localX, localY) calculated as follows:

$$localX = round((Lat - originLat)/0.001);$$

$$localY = round((Lon - originLon)/0.001);$$

where round (.) is the mathematical function that converts an argument of the function to the nearest integer. For example, round (0.1)=0, round (0.5)=1 and round (0.6)=1.

AP chooser 305 receives assignment of the APs to nodes of the grid and based upon at least one criterion, selects APs from each node to be included in a partial RM. Alternatively, the AP chooser may select, for each node, APs that are to be excluded from a partial RM. In an example embodiment of the invention, a criterion for selection may be that only a certain percentage, say p %, of the APs are selected to be included in a partial RM. In such a situation, p % of APs are selected at each grid node to be included in a partial RM. This way, the relative spatial density of the APs remains substantially similar to the original RM. For example, if a section of the area, Section 1, has higher AP density compared to another section of the area, Section 2, then after p % of the APs have been removed from both Sections, Section 1 will still have higher AP density than Section 2. Moreover, the ratio of the AP densities in Section 1 and Section 2 will remain substantially the same.

In another example embodiment of the invention, the AP chooser 305 may select at least one AP from a node if the node has an AP assigned to it. In other words, a node which had an AP assigned to it must in this embodiment have at least one AP selected for inclusion in a partial RM. In this embodiment, if the original RM had coverage in a section of the area, a partial RM would also have coverage in that section of the area. Thereby, a partial RM with reduced number of APs will have substantially similar coverage as the original RM.

Selecting a predetermined percentage of the APs is only one of many possible criteria of AP selection in a grid node. In another embodiment of the invention, total number of APs that is desired to be selected from an area may be determined, for example, 1000 APs or 50000 APs. In such a case, desired percentage, p, of the APs may be calculated as:

$$p = (\text{desired number of } APs \text{ in the area})/(\text{total number of } APs \text{ in the area}).$$

This p percentage of APs may then be chosen from every grid node in order to get approximately the desired number of APs in the area.

In yet another embodiment of the invention, it may be preferable to include APs with certain desirable characteristics in a partial RM. In such a situation, these characteristics of APs may be taken into account while selecting APs for each node. For example, it may be desirable to select APs which have featured in past positioning requests from user terminals. Such APs may be called hot APs. In some embodiments, hot APs are defined as APs that have been comprised in positioning requests with a frequency that satisfies a frequency criterion. Say, there are 10,000 APs in an area and it is desired to reduce the number of APs by 50% so that a partial RM is generated using 5,000 APs. Furthermore, there are 6,000 hot APs in the area. In such a situation, the AP chooser 305 may prioritize selection of hot APs for each node of the grid. Say, a node has 10 APs assigned to it and 6 of them are hot. Then while selecting 50% or 5 APs for this node, the AP chooser 305 may ensure that all 5 selected APs are hot. However, if there are only 4 hot APs assigned to a node, then the AP chooser 305 may select all 4 hot APs and then another one non-hot AP to result in total 5 selected APs for the node. In yet another embodiment of the invention, if 5,000 APs are to be selected from an area and only 4,000 of the APs in the area are hot, then the AP chooser may select the 4,000 hot APs to be included in a partial RM and select the remaining 1,000 AP randomly from the non-hot APs.

Various other criteria may be used to choose APs at each node, to be included in generation of partial RMs. These criteria may include at least one of:

Randomly remove a constant percentage of APs from each node.

Randomly select a constant percentage of APs from each node.

Randomly remove a constant number of APs from each node.

Randomly select a constant number of APs from each node.

In yet another embodiment of the invention, an AP may not be selected for inclusion in a partial RM if it may not be used for position calculation.

Note that other selection methods can also be utilized and the invention is not restricted to selection methods described herein.

The AP chooser 305 then saves identifiers of selected APs into Selected WLAN Database, SWDB, 308. The SWDB 308 may comprise a memory. An OW-RMG 201 may generate partial RMs using SWDB 308. The OW-RMG 201 may receive additional information needed for generation of partial RMs, such as AP locations, from other sources such as the global RM database 202, for example. In another embodiment of the invention, the SWDB 308 may store the locations of selected APs along with the AP identities and provide them to the OW-RMG 201.

In another embodiment of the invention, the SWDB 308 may be absent and the list of APs selected for inclusion in a partial RM together with one or more attributes of these APs may be provided directly to OW-RMG 201 from processor 301. The attributes of the APs may comprise one or more of AP locations and AP coverage area, for example.

The OW-RMG 201 may generate new partial RMs periodically, such as monthly or weekly, or upon request. The OW-RMG 201 may generate new partial RMs at least in part responsive to the value of p changing. The OW-RMG 201 may generate new partial RMs at least in part responsive to changing characteristic of APs. These characteristics of APs may be the location of APs and hotness of APs, for example.

Figure 4:
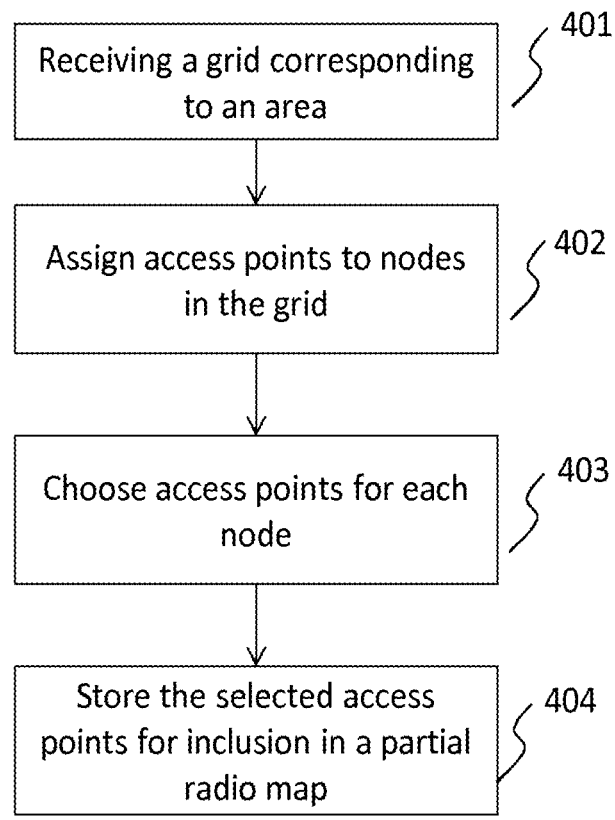
FIG. 4 is a flow diagram showing operations for grid based selection of APs in accordance with at least one embodiment of the invention.

FIG. 4 is a flow diagram showing operations of an AP selector for partial RMs 203 according to an example embodiment of the invention. The method may be executed by an apparatus, such as for example apparatus 300 of FIG. 3. In step 401, the AP selector for partial RMs 203 receives a grid corresponding to an area for which a partial RM is to be generated. The grid may be uniform or non-uniform. Furthermore, the distance between nodes of a grid may be based at least in part upon spatial density of APs in a location in vicinity of the node. A section of the area with a high AP density may have nodes of the grid placed closer than in a section where AP density is low. In step 402, the AP selector for partial RMs 203 assigns each AP in the area to a node in the grid. An AP may be assigned to a node that is closest to the AP location, for example. In step 403, a desired number of APs are chosen from each node for inclusion in a partial RM, subject to at least one predetermined criterion. The criterion may be to choose a predetermined fraction of APs assigned to a node, to choose a predetermined number of APs assigned to each node, to preferentially choose hot APs or to choose at least a predetermined number of APs assigned to each node, for example. In some embodiments of the invention, if a node had at least one AP assigned to it, at least one AP must be chosen from that node. In some embodiments of the invention, APs are chosen such that the spatial coverage with the reduced number of APs is substantially same as the spatial coverage with all APs, that is, with chosen and discarded APs combined. In some other embodiments of the invention, APs are chosen such that relative spatial density of the reduced set of APs is substantially same as the relative spatial density with all APs, that is, with chosen and discarded APs combined. In other words, if ratio of APs in section 1 of the area to APs in section 2 of the area is X, then the ratio of APs in section 1 of the area to APs in section 2 of the area after AP selection is close to X.

Finally in step 404, the APs which are selected as candidates for inclusion in a partial RM are stored for later use by, for example, offline WLAN RM generator 201.

It should be noted that in certain embodiments of the invention, one or more of the steps of flowchart in FIG. 4 may be absent.

FIG. 5 shows spatial coverage of APs before and after application of a method according to an embodiment of the invention. FIG. 5(*a*) shows an area of interest with location of all APs, from which only 50% of the APs may be chosen for inclusion in a partial RM. The area is divided into a grid with straight grid lines. In the embodiment of the invention demonstrated in FIG. 5, APs are first assigned to a closest grid node. In FIG. 5(*a*) arrows starting from AP locations and ending in a node indicate the node to which an AP is assigned. Thereafter, 50% of the APs are the chosen randomly from each grid node. The resulting chosen APs are shown in FIG. 5(*b*). As can be seen from FIG. 5(*b*), chosen APs cover the whole area of interest, there are no empty spots in the area and resultantly, a substantially similar spatial coverage when compared to FIG. 5(*a*) is achieved. Furthermore, availability of the position system using only selected APs is also expected to be similar to that a positioning system using all APs shown in FIG. 5(*a*). Availability of a positioning system is defined as the ratio of the number of successful positioning events to the total number of positioning requests. It can be appreciated that availability is an important metric affecting user experience and can be seriously affected if the number of APs in a radio map is reduced without exploiting methods of the invention.

FIG. 5(*c*) shows an effect of randomly choosing 50% of the APs from the area without using a grid based method in accordance with embodiments of the invention. It can be seen from FIG. 5(*c*) that there are empty spots in the upper left corner of the area and in the lower right corner of the area from where none of the APs were chosen. In those areas the availability of the position estimate will decrease.

Figure 6:
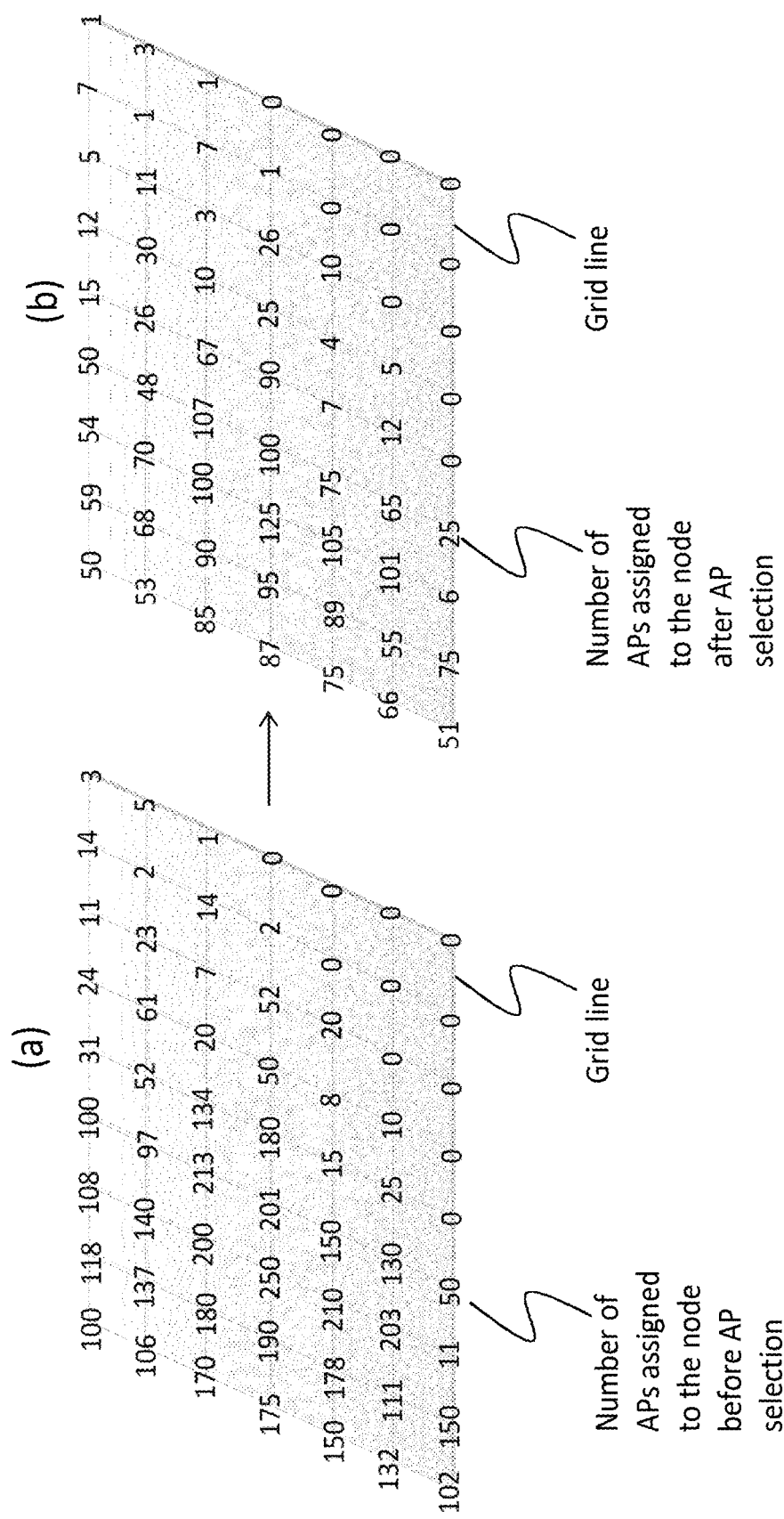
FIG. 6 shows resulting spatial density of APs after application of a method according to an example embodiment of the invention.

FIG. 6 shows resulting relative spatial density of APs after application of a method according to an example embodiment of the invention. FIG. 6(*a*) and FIG. 6(*b*) show an area to which grid based AP selection methods according to embodiments of the present invention are to be applied. A grid is formed in the area and in FIG. 6(a), all APs in the area are mapped to the closest grid nodes. Numbers shown at each grid node in FIG. 6(a) represent the number of APs assigned to the grid node. The situation in FIG. 6(a) is typical for urban environment, where there are buildings with APs in many floors and thus the number of APs in some of the grid nodes is high, such as in the centre of the grid). However, outside of the building, in the street, square or in the park the number of APs decreases rapidly, such as in the lower right corner of the grid.

Only 50% of the APs in the area are to be chosen for the partial RM. Selection of APs is made for each grid node. For example, if the original number of APs assigned to a grid node is 140, only 70 APs from the node will be chosen. The result of AP reduction is shown in FIG. 6(b). As can be seen from FIG. 6(b), relative spatial density of APs remains substantially same after reduction, throughout the area and as such, areas with high AP density before the reduction will have high AP density also after the reduction. Also in this embodiment, the AP reduction at each node is constrained such that if a node has at least one AP assigned to it, at least one AP is chosen from that node. For example, the node in the right-most column and third row from top has one AP assigned to it before AP reduction as well as after AP reduction. Such a constraint helps ensure spatial coverage in the areas with low AP density and diminishes the likelihood of empty spots in a partial RM in places which had APs in the original RM.

"Similar" spatial AP coverage means that the there are no empty spots in the offline RM in areas that had APs in original RM. Similar spatial density means that the offline RM has similar AP density as the original RM, in other words, the area with high AP density in the original RM will have high AP density also in the reduced RM, though smaller in absolute terms.

If desired, the different functions discussed herein may be performed in a different order and/or concurrently with each other. Furthermore, if desired, one or more of the above-described functions may be optional or may be combined.

Without in any way limiting the scope, interpretation, or application of the claims appearing below, a technical effect of one or more of the example embodiments disclosed herein is reducing a number of APs in a partial RM while maintaining substantially similar spatial coverage when compared to global RM. Another technical effect of one or more of the example embodiments disclosed herein is to reduce number of APs in a partial RM while maintaining substantially similar relative spatial density of APs when compared to a global RM. Another technical effect of one or more of the example embodiments disclosed herein is to reduce the size of partial RM files.

Embodiments of the present invention may be implemented in software, hardware, application logic or a combination of software, hardware and application logic. The software, application logic and/or hardware may reside on memory 307, processors 301, 303, 304, 305, 306 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
   a memory having stored thereon or being configured to store a partial radio map, wherein the partial radio map represents a plurality of access points in a geographic area, wherein the plurality of access points represented by the partial radio map is a subset of a set of access points represented by a full radio map of the geographic area, wherein the partial radio map maintains spatial coverage of the geographic area from the full radio map, and wherein the plurality of access points have (i) a relative spatial density in the partial radio map that substantially matches (ii) a relative spatial density of the set of access points in the full radio map;
   a collection unit configured to collect at least one measurement for the apparatus; and
   a processor configured to determine a position of the apparatus based on the at least one measurement for the apparatus and the partial radio map.

2. The apparatus of claim 1, wherein the partial radio map is a subset of a global radio map.

3. The apparatus of claim 1, wherein the at least one measurement includes signals from a navigation system.

4. The apparatus of claim 1, wherein the at least one measurement includes signals from a cellular network.

5. The apparatus of claim 1, wherein the at least one measurement includes signals from a short range wireless network.

6. The apparatus of claim 1, wherein the partial radio map includes a predetermined number of access points for each node in a grid for the partial radio map.

7. The apparatus of claim 6, wherein a distance between two nodes of the grid is based at least in part on a number of access points within a predetermined distance of the two nodes.

8. The apparatus of claim 1, wherein the position of a mobile device is determined offline without communication with a positioning server.

9. The apparatus of claim 1, wherein a file or data for storing the partial radio map is smaller than a file or data for storing the full radio map.

10. The apparatus of claim 9, wherein the partial radio map and full radio map both enable determination of the position.

11. A method for determining a position of a mobile device, the method comprising:

storing a partial radio map received from a server, the partial radio map representing a plurality of access points in a geographic area, wherein the plurality of access points represented by the partial radio map is a subset of a set of access points represented by a global radio map of the geographic area, wherein the partial radio map maintains spatial coverage of the geographic area between the global radio map and the partial radio map, and wherein the access points have (i) a relative spatial density in the partial radio map that substantially matches (ii) a relative spatial density of the set of access points in the global radio map for the geographic area;

collecting at least one measurement for the mobile device; and determining the position of the mobile device in response to the at least one measurement and the stored partial radio map.

12. The method of claim 11, wherein the position of the mobile device is determined offline without communication with the server.

13. The method of claim 11, wherein the at least one measurement includes signals from a navigation system, signals from a cellular network, or signals from a short range wireless network.

14. The method of claim 11, wherein the partial radio map is defined according to a grid for the geographic area.

15. The method of claim 11, wherein a file or data for storing the partial radio map is smaller than a file or data for storing the global radio map.

16. A non-transitory computer-readable medium encoded with instructions that, when executed by a computer, perform:

storing a partial radio map received from a server, the partial radio map representing a plurality of access points in a geographic area, wherein the plurality of access points represented by the partial radio map is a subset of access points represented by a global radio map of the geographic area, wherein the partial radio map maintains spatial coverage of the geographic area between the global radio map and the partial radio map, and wherein the access points have (i) a relative spatial density in the partial radio map that substantially matches (ii) a relative spatial density of the access points in the global radio map for the geographic area;

collecting at least one measurement for a mobile device; and determining a position of the mobile device in response to the at least one measurement and the stored partial radio map.

17. The non-transitory computer-readable medium of claim 16, wherein the position of the mobile device is determined offline without communication with the server.

18. The non-transitory computer-readable medium of claim 16, wherein the at least one measurement includes signals from a navigation system, signals from a cellular network, or signals from a short range wireless network.

19. The non-transitory computer-readable medium of claim 16, wherein the partial radio map is defined according to a grid for the geographic area.

20. The non-transitory computer-readable medium of claim 16, wherein a file or data for storing the partial radio map is smaller than a file or data for storing the global radio map.

* * * * *